United States Patent
Macedo et al.

(12)

(10) Patent No.: US 6,232,418 B1
(45) Date of Patent: *May 15, 2001

(54) PROCESS FOR THE PRODUCTION OF AN AROMATIC MODIFIED RESIN BASED ON CRUDE $C_5$

(75) Inventors: Anne Vera Macedo, Brussels; Martijn Hendrik Willem Burgers, Oud-Turnhout; Leonor Ma Garcia, Brussels; Lutz Erich Jacob, Tervuren; Jozef Aleida Florent Smits, Aarstelaar, all of (BE); R. Derric Lowery, Midland, NC (US); Jerry Lee Haluska, Baton Rouge, LA (US); Charles L. Sims, Baton Rouge, LA (US); Frank Carl Jagisch, Baton Rouge, LA (US)

(73) Assignee: Exxon Mobile Chemical Patents, INC, Baytown, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/876,825

(22) Filed: Jun. 17, 1997

(51) Int. Cl.[7] .................. C08F 240/00; C09J 157/02; C09J 153/02; C09J 193/00
(52) U.S. Cl. ................. 526/237; 526/283; 526/290
(58) Field of Search .................... 526/237, 283, 526/290

(56) References Cited

U.S. PATENT DOCUMENTS

| | | |
|---|---|---|
| 2,750,353 | 6/1956 | Mirviss et al. . |
| 2,754,288 | 7/1956 | Banes et al. . |
| 3,467,632 | 9/1969 | Davis et al. . |
| 3,622,551 | 11/1971 | Davis et al. . |
| 3,701,760 | 10/1972 | Hagemeyer et al. . |
| 3,950,453 | 4/1976 | Ishiguro et al. . |
| 4,008,360 | 2/1977 | Kudo et al. . |
| 4,076,923 * | 2/1978 | Milner et al. .................. 526/290 |
| 4,157,363 | 6/1979 | Hepworth . |
| 4,179,550 * | 12/1979 | Miyamoto et al. ............ 526/237 |
| 4,230,842 * | 10/1980 | Bullard et al. ................. 526/237 |
| 4,245,075 * | 1/1981 | Lepert .......................... 526/290 |
| 4,276,396 | 6/1981 | Gwynn . |
| 4,328,090 | 5/1982 | Stuckey, Jr. et al. . |
| 4,500,424 | 2/1985 | Simpson et al. . |
| 4,629,766 | 12/1986 | Malatesta et al. . |
| 4,686,030 | 8/1987 | Ward . |
| 4,846,961 | 7/1989 | Robinson et al. . |
| 4,849,093 | 7/1989 | Vauk et al. . |
| 4,857,617 | 8/1989 | Tanaka et al. . |
| 4,952,639 | 8/1990 | Minomiya . |
| 5,128,426 | 7/1992 | Yamasaki et al. . |
| 5,171,793 | 12/1992 | Johnson et al. . |
| 5,502,104 | 3/1996 | Hohner et al. . |
| 5,516,835 | 5/1996 | Malatesta et al. . |

FOREIGN PATENT DOCUMENTS

| | | |
|---|---|---|
| 0 082 726 | 6/1983 | (EP) . |
| 0 240 253 | 10/1987 | (EP) . |
| 0 455 105 | 11/1991 | (EP) . |
| 1408870 | 10/1975 | (GB) . |
| 2044277A | 10/1980 | (GB) . |
| 95/12623 | 5/1995 | (WO) . |

OTHER PUBLICATIONS

Database WPI/Derwent Publications Ltd. Abstract (XP002079396) for JP 61 197616 A (Toho Chem. Ind. Co., Ltd.; Toho Sekiyu Jushi KK), Sep. 1, 1986.
Hydrocarbon Resins, Kirk–Othmer Encyclopedia of Chemical Technology, v. 13, pp. 717–743 (J. Wiley & Sons, 1995).
Encyclopedia of Polymer Science and Engineering, vol. 7, pp. 758–782 (John Wiley & Sons, 1987).

* cited by examiner

*Primary Examiner*—Donald R. Wilson
(74) *Attorney, Agent, or Firm*—Catherine L. Bell; Joseph F. Reidy; John E. Schneider

(57) ABSTRACT

This invention relates to novel resins, blends of the novel resins with base polymers and a process for producing a resin comprising combining a reactor feed blend comprising:

(a) at least 2 weight % of isoprene,
(b) at least 2 weight % of one or more of dicyclopentadiene, substituted cyclopentadienes and substituted dicyclopentadienes,
(c) at least 2 weight % piperylene,
(d) at least 1 weight % aromatic olefins, and
(e) 0 to 92 weight % of additional aliphatic olefins, based upon the weight of the reactor feed blend, with a polymerization catalyst under polymerization conditions, preferably where the ratio of component (c) to component (b) is less than 8 and the ratio of component (a) to component (b) is less than 5.

16 Claims, No Drawings

PROCESS FOR THE PRODUCTION OF AN AROMATIC MODIFIED RESIN BASED ON CRUDE $C_5$

FIELD OF THE INVENTION

This invention relates to resins produced from feed blends comprising: isoprene; piperylene; aromatic olefins; and one or more of cyclopentadiene, substituted cyclopentadienes, dicyclopentadiene and substituted dicyclopentadienes, and processes to produce such resins and adhesives made therefrom.

BACKGROUND

Generally, $C_5$ aliphatic hydrocarbon resins are synthesized using a piperylene concentrate stream that has been fractionated to minimize levels of isoprene and cyclic diolefins such as cyclopentadiene and/or methylcyclopentadienes, as well as dimers and codimers of these compounds. The presence of these components in significant quantities (i.e. greater than 3 to about 5 percent) in polymerization feed blends is known to adversely affect the molecular weight and properties of the resin produced via cationic polymerization. For example, U.S. Pat. No. 2,750,353 discloses that high isoprene content (greater than 3.5 weight %) in the feedstock leads to inferior yields and gel formation. Likewise, U.S. Pat. No. 2,754,288 teaches that gel formation and poor molecular weight control result from the use of feeds that initially contain greater than 2 weight % cyclopentadiene. Isoprene and/or dicyclopentadienes have traditionally been considered undesirable at high concentrations in hydrocarbon resin feed blends targeted for catalytic polymerization due to their tendency to crosslink and form gels or resins of undesirably high molecular weight.

UK Patent Specification GB 1,408,870 (ICI), describes the heat soaking of a crude $C_5$ stream followed by direct polymerization without fractionation. The patent uses an aluminum chloride complex and does not mention the incorporation of aromatic olefins.

UK Patent Specification 2,044,277A (Sumitomo), describes the copolymerization of cyclopentadiene with a copolymerizable monomer (chain conjugated diolefin or olefin) using an aluminum chloride/oxygen rich containing electron donor/aromatic solvent complex claiming no gel formation. Sumitomo teaches that aluminum chloride powder is not suitable for these type polymerizations and discloses the polymerization of feed blends containing cyclopentadiene:isoprene ratios of from 3:1 to 1:3. Further Sumitomo does not mention the incorporation of aromatic olefins.

U.S. Pat. No. 5,516,835, which discloses a tackifier comprising an isoprene based hydrocarbon resin obtained by the cationic polymerization (aluminum chloride) of a feed blend consisting of from 40–90 wt % isoprene and from 10–60 wt % of an aliphatic monoolefin (e.g., 2-methyl-2-butene).

U.S. Pat. No. 5,516,835 also discloses hot melt and pressure sensitive adhesive systems based on amorphous polypropylene, natural rubber and styrenated block copolymers. Further, the optional use of piperylenes, DCPD and aromatic olefins is disclosed.

U.S. Pat. No. 4,008,360 discloses resin produced from a $C_5$ fraction that has been subjected to an adjustment of a weight ratio of acyclic diolefins to monooelfins and a weight ratio of cyclic diolefins to monoolefins of from 0.40 to 0.70 and from 0.07 to 0.35, respectively. The inclusion of aromatic olefins is not disclosed. Likewise, U.S. Pat. No. 4,952,639 discloses resins produced from a $C_5$ fraction having aromatic mono-olefin and certain ratios of diolefins and mono-olefins, however dicyclopentadiene is absent.

Two other U.S. Patents. of interest are U.S. Pat. No. 3,950,453 (Nippon Zeon) and U.S. Pat. No. 3,467,632 (Reichold). Both of these patents disclose the cationic polymerization of feed blends containing up to 30 wt % isoprene, including the use of isoprene dimers (terpenes) as softening point boosters.

Hence, feedstocks with low levels of isoprene and dicyclopentadienes have been preferred in the industry. However, obtaining these feedstocks has required expensive purification procedures. Therefore, there is a need in the art to provide a method to polymerize the mix of isoprene cyclopentadiene/dicyclopentadienes, piperylene feedstocks into hydrocarbon resins without the undesirable gels or very high molecular weights.

BRIEF DESCRIPTION OF THE INVENTION

This invention relates to a process for producing a resin comprising combining a reactor feed blend comprising:
(a) at least 2 weight % of isoprene,
(b) at least 2 weight % of one or more of dicyclopentadiene, substituted cyclopentadienes and substituted dicyclopentadienes,
(c) at least 2 weight % piperylene,
(d) at least 1 weight % aromatic olefins, and
(e) 0 to 92 weight % of additional aliphatic olefins, based upon the weight of the reactor feed blend, with a polymerization catalyst under polymerization conditions This invention further relates to adhesive compositions comprising the resins described above.

DETAILED DESCRIPTION

In a preferred embodiment, this invention relates to a process for producing a resin comprising combining a reactor feed blend comprising:
(a) 2 to 50 weight % isoprene,
(b) 2 to 20 weight % of one or more of dicyclopentadiene, substituted cyclopentadienes and substituted dicyclopentadienes,
(c) 2 to 20 weight % piperylene,
(d) 1 to 50 weight % aromatic olefins, and
(e) 2 to 90 weight % of additional aliphatic olefins, based upon the weight of the reactor feed blend,
with a polymerization catalyst under polymerization conditions, provided that the ratio of component (c) to component (b) is less than 8 and the ratio of component (a) to component (b) is less than 5, preferably the ratio of component (c) to component (b) is less than 5 and the ratio of component (a) to component (b) is less than 2.

The isoprene is preferably present at 2 to 30 weight %, even more preferably at 2 to 20 weight %.

Preferred substituted cyclopentadienes include cyclopentadienes substituted with a with a $C_1$ to $C_{40}$ linear, branched or cyclic alkyl group, preferably one or more methyl groups. Methylcyclopentadiene is a preferred substituted cyclopentadiene.

The term dicyclopentadiene is defined to include both the endo an exo forms of dicyclopentadiene. Preferred substituted dicyclopentadienes include dicyclopentadienes substituted with a $C_1$ to $C_{40}$ linear, branched or cyclic alkyl group, preferably one or more methyl groups.

Preferred aromatic olefins include one or more of styrene, indene, derivatives of styrene and derivatives of indene. Particularly preferred aromatic olefins include styrene, alpha-methylstyrene, beta-methylstyrene, indene and methylindenes and vinyl toluenes. The aromatic olefins are typically present at 1 to 92 weight %, preferably 1 to 50 weight %, even more preferably 1 to 30 weight %, even more preferably 1 to 10 weight %.

In a preferred embodiment the feed comprises 5 to 90 weight % of one or more aliphatic olefins, preferably between 10 and 85 weight %, even more preferably between 50 and 70 weight %. In a preferred embodiment the aliphatic olefins arc $C_4$ to $C_{20}$ linear, branched or alicyclic olefins or non-conjugated diolefins, preferably one or more of $C_4$ to $C_7$ linear, branched or alicyclic olefins or non-conjugated diolefins, even more preferably a mixture of $C_5$ and $C_6$ linear, branched or alicyclic olefins or non-conjugated diolefins. In another preferred embodiment the aliphatic olefins comprise one or more natural or synthetic terpenes, preferably one or more of alpha-pinene, beta-pinene, $\Delta$-3-carene, dipentene, limonenes and/or isoprene dimers. The aliphatic olefins are preferably present at a ratio of weight % conjugated diolefin to weight % aliphatic olefin of 0.05 to 3.0, preferably 0.05 to 2.0.

Preferred resins produced herein have a ring and ball softening point of 10 to 140° C., Preferably 80 to 120° C. In another embodiment preferred resins produced herein have a weight-average molecular weight (Mw) of 4000 or less, preferably between 500 and 4000, preferably 500–2500. In another preferred embodiment the resins produced herein have an Mw/Mn of 3 or less, preferably between 1 and 2.5, even more preferably between 1 and 2.

The resins described above may be produced by methods generally known in the art for the production of hydrocarbon resins. See for example, the Kirk-Othmer Encyclopedia Of Chemical Technology, 4th ed., Vol. 13, pp.717–744. A preferred method for production of the resins described above is combining the feed stream in a polymerization reactor with a Friedel-Crafts or Lewis Acid catalyst at a temperature between 0° C. and 200° C., preferably between 0° C. and 120° C., even more preferably between 20° C. and 80° C. Friedel-Crafts polymerization is generally accomplished by use of known catalysts in a polymerization solvent, and removal of solvent and catalyst by washing and distillation. The polymerization process utilized for this invention may be in a batchwise of continuous mode using techniques known in the art. Continuous polymerization may be accomplished in a single stage or in multiple stages as is taught in U.S. Pat. Nos. 3,701,760 and 4,276,396. The Friedel-Crafts catalysts to be used as a polymerization catalysts are generally Lewis Acids such as metallic halides or alkyls such as aluminum trichloride, boron trifluoride, aluminum tribromide or a mixture thereof, as well as ternary complexes of the halides, aromatic compounds and hydrogen halides. Possible aromatic compounds include benzene and mono-, di- and poly-alkylbenzenes such toluene, xylene, cymene, and cumene. Examples of hydrogen halides to be used in the complexing include hydrogen chloride, hydrogen bromide, hydrochloric acid, and hydrobromic acid. The amount of Lewis Acid to be used in the catalyst is in the range of from 0.3 to 3.0 weight %, based upon the weight of the feed blend, preferably 0.3 to 3.0 weight %, even more preferably 0.5 to 1.0 weight %. The aluminum trichloride catalyst is preferably used as a powder.

For additional description of feedstream derivation, monomer composition, methods of polymerization and hydrogenation, see Hydrocarbon Resins, Kirk-Othmer Encyclopedia of Chemical Technology, v. 13, pp. 117–743 (J. Wiley & Sons, 1995); Encyclopedia of Polymer Science and Engineering, vol. 7, pp. 758–782 (John Wiley & Sons, 1987), EP 0 240 253 and the references cited in all three of them.

In another preferred embodiment the resins of this invention may be hydrogenated. The hydrogenation of hydrocarbon resins may be carried out via molten or solution based processes by either a batchwise or, more commonly, a continuous process. Catalysts employed for the hydrogenation of hydrocarbon resins are typically supported monometallic and bimetallic catalyst systems based on group 6, 8, 9, 10 or 11 elements. Catalysts such a Nickel on a support ( for example, Nickel on alumina, Nickel on charcoal, Nickel on silica, Nickel on Kieselguhr, etc), Palladium on a support (for example, Palladium on silica, Palladium on charcoal, Palladium on magnesium oxide, etc) and copper and or zinc on a support (for example copper chromite on copper and or manganese oxide, copper and zinc on alumina, etc) are good hydrogenation catalysts in the practice of this invention. The support material is typically comprised of such porous inorganic refractory oxides as silica, magnesia, silica-magnesia, zirconia, silica-zirconia, titanic silica-titania, alumina, silica-aluminum alumino-silicate, etc., with supports containing γ-alumina being highly preferred. Preferably, the supports are essentially free of crystalline molecular sieve materials. Mixtures of the foregoing oxides are also contemplated, especially when prepared as homogeneously as possible. Among the useful supports materials in the present invention are the supports disclosed in the U.S. Pat. Nos. 4,686,030, 4,846,961, 4,500,424, and 4,849,093. Preferred supports include alumina, silica, carbon, MgO, $TiO_2$, $ZrO_2$, $FeO_3$ or mixtures thereof.

Any of the known processes for catalytically hydrogenating hydrocarbon resins can be used to hydrogenate the resins of this invention, in particular the processes of U.S. Pat. No. 5,171,793, U.S. Pat. No. 4,629,766, U.S. Pat. No. 5,502,104 and U.S. Pat. No. 4,328,090 and WO 95/12623 are suitable. Generic hydrogenation treating conditions include reactions in the temperature of about 100° C.–350° C. and pressures of between five atmospheres (506 kPa) and 300 atm. (30390 kPa) hydrogen, for example, 10 to 275 atm. (1013 kPa to 27579 kPa). In one embodiment the temperature is in the range including 180° C. and 320° C. and the pressure is in the range including 15195 kPa and 20260 kPa hydrogen. The hydrogen to feed volume ratio to the reactor under standard conditions (25° C., 1 atm (101 kPa) pressure) typically can range from 20–200, for water-white resins 100–200 is preferred.

Another suitable processes for hydrogenating the resin of this invention is that described in EP 0 082 726. EP 0 082 726 describes a process for the catalytic or thermal hydrogenation of petroleum resins using nickel-tungsten catalyst on a gamma-alumina support wherein the hydrogen pressure is $1.47 \times 10^7 – 1.96 \times 10^7$ Pa and the temperature is in the range of 250–330° C. Thermal hydrogenation is usually done at 160 to 320° C., at a pressure of $9.8 \times 10^5$ to $11.7 \times 10^5$ Pa and for a period typically of 1.5 to 4 hours. After hydrogenation the reactor mixture may be flashed and further separated to recover the hydrogenated resin. Steam distillation may be used to eliminate oligomers, preferably without exceeding 325° C. resin temperature.

In a preferred embodiment the hydrogenation is carried out by contacting the resin in the presence of hydrogen and hydrogenation catalyst metal compounds supported on porous refractory substrate particles having: a) mean maxim diffusion path length less than or equal to twice the hydraulic radius; b) a pore volume distribution wherein: i) pores having diameters >150,000 Å constitute greater than about 2% of the total volume, ii) pores having diameters >20,000 Å and <150,000 Å constitute greater than about 1% of the total volume, and iii) pores having diameters >2,000 Å and <20,000 Å constitute greater than about 12% of the total volume; and, c) a total pore volume of from about 45% to 86% of the total volume of the substrate particles. In a particularly preferred embodiment the catalyst comprises nickel and/or cobalt on one or more of molybdenum, tungsten, alumina or silica supports. In a preferred embodiment, the amount of the nickel oxide and/or cobalt oxide on the support ranges from 2 to 10 weight percent. The amount of tungsten or molybdenum oxide on the support after preparation ranges from 5 to 25 weight percent. Preferably the catalyst contains 4 to 7 weight percent nickel oxide and 18 to 22 weight percent tungsten oxide. This process and suitable catalysts are described in greater detail in copending application U.S. Ser. No. 08/755,267 filed Nov. 22, 1996, which is incorporated by reference herein.

In another preferred embodiment the hydrogenation may be carried out by the process and catalysts described in U.S. Pat. No. 4,629,766. In particular, Nickel-Tungsten catalysts on gamma-alumina are preferred.

The resins of this invention may be combined with a base polymer to form an adhesive. Typical base polymers include homopolyetlylene, ethylene copolymerized with up to 50 weight % of one or more $C_3$ to $C_{20}$ α-olefins, polypropylene, propylene copolymerized with up to 50 weight % of one or more of ethylene and/or $C_4$ to $C_{20}$ α-olefins, polybutene, ethylene vinyl acetate, low density polyethylene (density 0.915 to less than 0.935 g/cm$^3$) linear low density polyethylene, ultra low density polyethylene (density 0.86 to less than 0.90 g/cm$^3$), very low density polyethylene (density 0.90 to less than 0.915 g/cm$^3$), medium density polyethylene (density 0.935 to less than 0.945 g/cm$^3$), high density polyethylene (density 0.945 to 0.98 g/cm$^3$), EMA, copolymers of acrylic acid, polymethylmethacrylate or any other polymers polymerizable by a high-pressure free radical process, PVC, polybutene-1, isotactic polybutene, elastomers such as ethylene-propylene rubber (EPR), vulcanized EPR, EPDM, block copolymer elastomers such as SBS (Styrene-Butadiene-Styrene), SIS (Styrene-Isoprene-Styrene), nylons, polycarbonates, PET resins, crosslinked polyethylene, copolymers of ethylene and vinyl alcohol (EVOH), polymers of aromatic monomers such as polystyrene, copolymers of isobutylene and para-alkyl styrene, poly-1 esters, high molecular weight HDPE, low molecular weight HDPE, graft copolymers generally, polyacrylonitrile homopolymer or copolymers, thermoplastic polyamides, polyacetal, polyvinylidine fluoride and other fluorinated elastomers, polyethylene glycols, polyisobutylene (PIB) or blends thereof.

In a preferred embodiment the base polymer is selected from the group consisting of: block copolymers of styrene and isoprene or butadiene, polyisoprene, butyl rubber, ethylene vinyl acetate, ethylene methyl acrylate, amorphous polypropylene, ethylene propylene diene monomer rubber, copolymers of ethylene and a $C_3$ to $C_{20}$ α-olefin, copolymers of propylene and ethylene or a $C_4$ to $C_{20}$ α-olefin, metallocene polyethylenes, metallocene polypropylenes, natural rubber, styrene butadiene rubber, copolymers of iso-butylene and para-alkylstyrene. Particularly preferred polymers are: styrene-butadiene-styrene block copolymers, butyl rubber, natural rubber and styrene-butadiene rubber.

In a particularly preferred embodiment the base polymer is an SIS (Styrene-Isoprene-Styrene) block copolymer. In another particularly preferred embodiment the SIS block copolymer has 10 weight % or less diblock present, preferably 5 weight % or less. A preferred base polymer is styrene-isoprene-styrene block copolymer as commercially available from DEXCO POLYMERS under the trade name VECTOR®.

In another preferred embodiment the base polymer is a polymer produced using a metallocene catalyst system. Typically the metallocene homopolymers or copolymers are produced using mono- or bis-cyclopentadienyl transition metal catalysts in combination with an activator of alumoxane and/or a non-coordinating anion in solution, slurry, high pressure or gas phase. The catalyst system may be supported or unsupported and the cyclopentadienyl rings by may substituted or unsubstituted. Titanium, Zirconium and Hafnium are preferred transition metals. Several commercial products produced with such catalyst/activator combinations are commercially available form Exxon Chemical Company in Baytown Tex. under the tradenames EXCEED™ and EXACT™. For more information on the methods and catalysts/activators to produce such metallocene homopolymers and copolymers see WO 94/26816; WO 94/03506; EPA 277,003; EPA 277,004; U.S. Pat. No. 5,153,157; U.S. Pat. No. 5,198,401; U.S. Pat. No. 5,240,894; U.S. Pat. No. 5,017,714; CA 1,268,753; U.S. Pat. No. 5,324,800; EPA 129,368; U.S. Pat. No. 5,264,405; EPA 520,732; WO 92 00333; U.S. Pat. No. 5,096,867; U.S. Pat. No. 5,507,475; EPA 426 637; EPA 573 403; EPA 520 732; EPA 495 375; EPA 500 944; EPA 570 982; WO 091/09882; WO 094/03506 and U.S. Pat. No. 5,055,438.

The metallocene produced copolymers described above preferably have a composition distribution breadth index (CDBI) of 50% or more, preferably above 60%, even more preferably above 70%. In one embodiment the CDBI is above 80%, even more preferably above 90%, even more preferably above 95%. In another particularly preferred embodiment, the polyethylene copolymer has a CDBI between 60 and 85%, even more preferably between 65 and 85%.

Composition Distribution Breadth Index (CDBI) is a measure of the composition distribution of monomer within the polymer chains and is measured by the procedure described in PCT publication WO 93/03093, published Feb. 18, 1993 including that fractions having a weight average molecular weight (Mw) below 15,000 are ignored when determining CDBI.

The resin may be present in the blend from 1 to 200 parts per 100 parts of base polymer in the adhesive formulation. In a preferred embodiment the resin may be present in the blend from 25 parts to 200 parts per 100 parts of polymer. In another embodiment the preferred range is 80 to 120 parts resin per 100 parts polymer.

The adhesive formulations may also contain additives well known in the art such as anti-block, anti-stat, antioxidants, crosslinking agents, silica, carbon black, talc, pigments, fillers, processing aids, UV stabilizers, neutralizers, lubricants, surfactants and/or nucleating agents. Preferred additives include silicon dioxide, titanium dioxide, polydimethylsiloxane, talc, dyes, wax, calcium stearate, carbon black and glass beads.

The resins of this invention may be formed into pressure sensitive adhesives, hot melt adhesives or contact adhesives and used in applications such as Tapes, Labels, Paper Impregnation, Hot Melt Adhesives including Woodworking, Packaging, Bookbinding or Disposables, Sealants, Rubber Compounds, Pipe Wrapping, Carpet Backing, Contact Adhesives, Road-Marking or Tire construction.

In a particularly preferred embodiment the resins are formulated into a pressure sensitive adhesive application. Such a pressure sensitive adhesive composition may be applied to any conventional backing layer such as paper, foil, polymeric film, release liners, woven or non-woven backing material to make for example, packaging tapes.

EXAMPLES

The feed streams used in the following examples are described in Table 1.

In the following examples the 2-methylbutene concentrate was 92% 2-Methyl-2-Butene and 6% 2-Methyl-1-Butene. Softening point was measured as a ring and ball softening point according to ASTM E-28.

Cloud point was the point at which there is a haze or "cloud" in a mixture of 40 parts 60° C. melt point paraffin wax, 20 parts ESCORENE® UL7750 (ethylene vinyl acetate, 28% vinyl acetate) from Exxon Chemical Company and 54 parts test resin heated to 200° C. and allowed to cool in air with stirring. The GPC was calibrated with polystyrene standards. Molecular weight is calculated as polyisobutylene equivalents from the following equation:

$$\text{Log(PIB)} = (11.1)(\text{Log(PS}_{mw})) - 0.517$$

TABLE I (Compositions Of Streams Used in Examples)

| Composition (Wt %) | Steam "Stream A" Crude C$_5$s | "Stream B" Mixed Cracked Raffinate | "Stream C" Aromatic Stream |
|---|---|---|---|
| 1,4-Pentadiene | — | — | — |
| 1-Pentene | 2.98 | 0.04 | — |
| 2-Methyl-1-Butene | 3.59 | 0.01 | — |
| Isoprene | 15.6 | 0.45 | — |
| trans-2-Pentene | 2.65 | 5.58 | — |
| cis-2-Pentene | 1.36 | 3.81 | — |
| 2-Methyl-1-Butene | 3.41 | 1.33 | — |
| trans-1,3-Pentadiene | 7.94 | 1.21 | — |
| Cyclopentadiene (CPD) | 1.7 | — | 0.39 |
| cis-1,3-Pentadiene | 4.59 | 4.87 | — |
| Cylopentene | 5.41 | 13.5 | — |
| 3/4-Methyl-1-Pentene | 0.15 | 1.69 | — |
| 2,3-Dimethyl-1-Butene | 0.03 | 0.46 | — |
| E/Z-4-Methyl-2-Pentene | 0.37 | 7.79 | — |
| 3-Methyl-1,4-Pentadiene | 0.25 | 1.90 | — |
| 2-Methyl-1-Pentene | 0.01 | 0.55 | — |
| 1-Hexene | 0.04 | 1.89 | — |
| cis-1,4-Hexadiene | 0.03 | 0.27 | — |
| trans-3-Hexene | 0.01 | 1.79 | — |
| trans-2-Hexene/cis-3-Hexene | 0.12 | 4.11 | — |
| 2-Methyl-2-Pentene | 0.08 | — | — |
| 2,3-Dimethyl-2-Butene | 0.01 | 3.67 | — |
| cis-2-Hexene | 0.19 | 0.26 | — |
| Benzene | 0.86 | 3.70 | — |
| Styrene | — | — | 7.93 |
| Unreactive Aliphatics | — | 41.1 | 16.6 |
| alpha-Methylstyrene | — | — | 3.89 |
| cis-beta-Methystyrene | — | — | 0.89 |
| meta-Methylstyrene | — | — | 8.14 |
| ortho-Methylstyrene | — | — | 2.95 |
| para-Methylstyrene | — | — | 3.18 |
| trans-beta-Methylstyrene | — | — | 2.08 |
| DCPD (endo + exo) | 18.9 | — | 0.66 |
| Indene | — | — | 13.7 |
| Methylindene | — | — | 0.46 |
| Dimethylstyrene | — | — | 1.78 |
| Ethylstyrene | — | — | 1.71 |
| Divinyibenzene | — | — | 4.38 |
| MCPD Dimer | — | — | 0.45 |

TABLE I-continued (Compositions Of Streams Used in Examples)

| Composition (Wt %) | Steam "Stream A" Crude C$_5$s | "Stream B" Mixed Cracked Raffinate | "Stream C" Aromatic Stream |
|---|---|---|---|
| Propyl Styrene | — | — | 0.78 |
| Alkyl Aromatics | — | — | 30.0 |

Examples 1 and 2

The resins produced in Table II were polymerized via a continuous process employing a continuously stirred tank reactor (CSTR) using aluminum chloride as the catalyst in a nitrogen atmosphere at approximately 45 psig (3.2 kg/cm$^2$). The reactor feed blend composition, indicated in Table 1, was added continuously to the reactor at such a rate as to maintain an approximate 90 minute residence time in the reactor. The aluminum chloride catalyst of particle size distribution 5–200 mesh was added continuously to the reactor to maintain a 0.8 wt % catalyst concentration based on feed. Polymerizate was continuously discharged from the reactor and quenched with a 1:3 solution of isopropanol and water followed by water washing several times to remove the quenched catalyst residue. After each washing, the aqueous layer was discarded.

The resin was recovered by heating the washed polymerizate to 250° C. while sparging with nitrogen to remove the unreacted components and low molecular weight oligomers followed by steam stripping to remove the heavier oligomers (fill).

Examples 1 and 2 represent aromatic aliphatic resins produced from a crude C$_5$ stream such as the one represented in Table I (Stream B).

TABLE II

Resins From Crude C$_5$s

| Feed Composition (Wt %) | Ex 1 | Ex 2 |
|---|---|---|
| Stream A | 45.0 | 58.0 |
| Stream B | 42.8 | 18.5 |
| 2-Methylbutene Concentrate | 7.0 | 15.5 |
| Styrene | 3.2 | — |
| Mixed Aromatic Concentrate | — | 8.0 |
| Benzene | 2.0 | 2.0 |
| Key Components | | |
| Piperylenes | 8.2 | 8.4 |
| Isoprene | 7.2 | 9.1 |
| cyclics | 9.0 | 11.6 |
| Piperylene/Cyclics | 0.9 | 0.7 |
| Isoprene/Cyclics | 0.8 | 0.7 |
| Reaction Conditions | | |
| AlCl$_3$ (wt %) | 0.8 | 0.8 |
| Reaction Temperature (° C.) | 45 | 80 |
| Reactor Pressure (psig) | 15 | 45 |
| Finishing | | |
| Resin Yield (Wt %) | 29.4 | 38.9 |
| Fill Yield (Wt %) | 4.9 | — |
| Raffinate Yield (Wt %) | 64.8 | — |
| Wt % Gel Based On Feed | 0 | 0 |
| Resin Properties | | |
| Softening Point (° C.) | 93.2 | 94.8 |
| 20/54/40 Cloud Point (° C.) | 68 | 73 |
| Gardner Color | 5.5 | 7.0 |

TABLE II-continued

Resins From Crude $C_5$s

| Feed Composition (Wt %) | Ex 1 | Ex 2 |
|---|---|---|
| GPC Molecular Weight | | |
| Mw | 1,395 | 1,601 |
| Mn | 696 | 717 |
| Mw/Mn | 2.0 | 2.2 |
| Mz | 3,335 | 5,377 |

Synthesis of Resins from Raw $C_5$

The examples reported in Tables III and IV resulted from the polymerization via a semi-continuous process in a batch reactor except example 7 which was done in continuous stirred tank reactor. The feed blend was added by portion over 75 min as well as the catalyst (aluminum chloride powder) in a nitrogen atmosphere and under efficient stirring. Catalyst level was 0.75 wt % on total feed blend. The reactor mixture was stirred for an extra 15 min after all the ingredients had been added to the reactor. Total residence time was then 90 min. Reaction temperature was between 40 to 50° C. The reactor content was quenched with water and neutralized with a solution of ammonia. The aqueous layer was discarded and the polymerizate was further stripped to remove unreacted monomers (nitrogen stripping at 200° C.) and low molecular weight oligomers (steam stripping up to 250° C.). Resin yield was the amount of resin recovered on total feed blend. Example 7 was polymerized under the same conditions as example 1.

Raw $C_5$ in Tables III, IV and V comprised 12–17 weight % piperylene, 16–19 weight % isoprene, 10–20 weight % cyclopentadiene, dicyclopentadiene, substituted cyclopentadienes and substituted dicyclopentadienes and 21–26 weight % $C_4$ to $C_6$ aliphatic olefins.

Table III reports examples of low aromatic modified resins (Ex-3 to Ex-7) and high aromatic modified resins (Ex-8 to Ex-10). For low aromatic modified resins Ex-3 and Ex-4 are two reference examples made from traditional feed blends containing piperylene (Ex-3) or isoprene+piperylene (Ex-4) as conjugated dienes whereas Ex-5 to Ex-7 are made from crude $C_5$ cut ("Raw $C_5$") and the reactor feed blend comprises three types of conjugated dienes (piperylene, isoprene, and cyclopentadiene/dicyclopentadiene). For high levels of aromatic olefins Ex-8 is a reference sample made from traditional feed blend containing isoprene and piperylene, excluding cyclodiene and dicyclopentadienes. Ex-9 and Ex-10 are made from crude $C_5$ cut and the reactor feed blend contains the three types of conjugated dienes as indicated in Table III and Table IV reports two examples of high softening point resins with a high level of aromaticity made from crude $C_5$.

TABLE III

Aromatic Modified Resins

| | Low Aromatic Modified | | | | | High Aromatic Modified | | |
|---|---|---|---|---|---|---|---|---|
| | Example # | | | | | | | |
| | Ex 3* | Ex 4 | Ex 5 | Ex 6 | Ex 7 | Ex 8 | Ex 9 | Ex 10 |
| Feed Blend (wt %) | | | | | | | | |
| Piperylene cut[1] | 40 | 24 | 24 | 10 | — | — | — | — |
| IBP-70 (pip./isopr.)[2] | — | 21 | — | — | — | 35 | 12 | — |
| Raw $C_5$ | — | — | 20 | 37 | 47 | — | 20 | 29 |
| $C_5$–$C_6$ monoolfins | 49 | 31 | 46 | 43 | 43 | 7 | 16 | 28 |
| Isomrat[3] | 7 | 17 | — | — | — | 24 | 17 | 9 |
| $C_8$–$C_{10}$ aromatics | — | 7 | 10 | 10 | 10 | 34 | 35 | 34 |
| Styrene | 4 | — | — | — | — | — | — | — |
| Key Components: | | | | | | | | |
| Piperylene (wt %) | 25.8 | 18.3 | 18.3 | 13.0 | 8.3 | 6.4 | 4.9 | 4.1 |
| Isoprene (wt %) | 0.38 | 4.6 | 3.6 | 6.9 | 8.6 | 7.0 | 5.7 | 4.8 |
| cpd/dcpd (wt %) | 1.0 | 1.2 | 4.8 | 4.3 | 5.0 | <1 | 4.3 | 5.8 |
| Diolefins/Olefins Ratio[4] | 0.73 | 0.74 | 0.71 | 0.65 | 0.60 | 0.86 | 0.84 | 0.65 |
| Piperylene/Cyclics | 25.8 | 15.3 | 3.8 | 3.0 | 1.7 | 6.4 | 1.1 | 0.7 |
| Isoprene/Cyclics | 3.8 | 0.75 | 1.6 | 1.7 | 0.8 | >7 | 1.3 | 1.2 |
| Reaction Yield (wt %) | 44 | 36 | 41 | 37 | 34 | 42 | 42 | 42 |
| Resin Properties | | | | | | | | |
| Softening Point (° C.) | 92 | 91 | 92 | 89 | 88 | 99 | 103 | 98 |
| (30/45/25) Cloud Pt. (° C.)[5] | 80 | 86 | 83 | 83 | 83 | 85 | 86 | 86 |
| Eq. styrene (wt %)[6] | 7 | | 9 | 9 | 10 | 32 | 32 | 33 |
| Molecular Wt. (GPC)[7] | | | | | | | | |
| Mn | 1140 | 1210 | 1150 | 1220 | 1150 | 890 | 860 | 720 |
| Mw | 1760 | 2210 | 1860 | 2160 | 2020 | 1950 | 1750 | 1350 |
| Mz | 2900 | 4620 | 3180 | 4120 | 3830 | 5630 | 4850 | 3040 |
| Mw/Mn | 1.5 | 1.8 | 1.6 | 1.8 | 1.8 | 2.2 | 2.0 | 1.9 |
| Melt viscosity @150° C.[8] | 1010 | 1131 | 1075 | 1115 | 988 | 1673 | 2510 | 1550 |

*Ex-3 was polymerized in a CSTR.

TABLE IV

Aromatic Modified - High Softening Point Resins

| Example # | Ex 11 | Ex 12 |
|---|---|---|
| Feed Blend (wt %) | | |
| Raw $C_5$ | 17 | 18 |
| $C_5$–$C_6$ monoolefins | 7 | 13 |
| Isomerat [3] | 31 | 16 |
| $C_8$–$C_{10}$ aromatics | 35 | 53 |
| α-pinene | 10 | — |
| Key Components: | | |
| Piperylene (wt %) | 2.3 | 2.5 |
| Isoprene (wt %) | 2.8 | 3.0 |
| cpd/dcpd (wt %) | 3.5 | 3.7 |
| Diolefins/Olefins Ratio [4] | 1.11 | 0.79 |
| Piperylene/Cyclics | 0.65 | 0.7 |
| Isoprene/Cyclics | 0.8 | 0.8 |
| Reaction Yield (wt %) | 34 | 45 |
| Resin Properties | | |
| Softening Point (° C.) | 118 | 114 |
| (30/45/25) Cloud Point (° C.) [5] | 86 | 104 |
| Eq. styrene (wt %) [6] | 37 | 47 |
| Molecular Weight (GPC) [7] | | |
| Mn | 760 | 710 |
| Mw | 1490 | 1470 |
| Mz | 3770 | 4230 |
| Mw/Mn | 2 | 2.1 |
| Melt viscosity @150° C. [8] | 8910 | 5390 |

Notes for Tables III & IV:
[1] piperylene cut was a cut comprising piperylene (50 wt % min), less than 2 wt % isoprene, less than 2 wt % cyclopentadiene/methylcyclopentadiene and corresponding dimers.
[2] IBP-70 was a diolefin/olefin cut essentially containing 20–30 wt % isoprene and 15–25 wt % 1,3-cis, trans-pentadiene (piperylene) and less than 3 wt % cyclopentadiene/dicyclopentadiene (removed by fractionation).
[3] Isomerat was a paraffinic cut comprising from $C_4$ to $C_{10}$ paraffins and was used as diluent.
[4] Diolefins/Olefins ratio (wt %). Diolefins were the total diolefins in the feed blend. Olefins were all the monoolefins.
[5] (30/45/25) = (EVA/resin/wax) - EVA was Escorene ® UL02528 CC - wax was a 68° C. melting point paraffin wax.
[6] Aromaticity level was the integration of aromatic protons in $^1$H-NMR given as weight % styrene equivalent.
[7] GPC: molecular weights were polystyrene equivalent.
[8] Melt viscosity was measured with a Brookfield Thermosel, Series RVT, Spindle 21

Notes for Tables III & IV (1) piperylene cut was a cut comprising piperylene (50 wt % min), less than 2 wt % isoprene, less than 2 wt % cyclopentadiene/methylcyclopentadiene and corresponding dimers.
(2) IBP-70 was a diolefin/olefin cut essentially containing 20–30 wt % isoprene and 15–25 wt % 1,3-cis, trans-pentadiene (piperylene) and less than 3 wt % cyclopentadiene/dicyclopentadiene (removed by fractionation).
(3) Isomerat was a paraffinic cut comprising from $C_4$ to $C_{10}$ paraffins and was used as diluent.
(4) Diolefins/Olefins ratio (wt %). Diolefins were the total diolefins in the feed blend. Olefins were all the monoolefins.
(5) (30/45/25)=(EVA/resin/wax) - EVA was Escorene® UL02528 CC - wax was a 68° C. melting point paraffin wax.
(6) Aromaticity level was the integration of aromatic protons in $^1$H-NMR given as weight % styrene equivalent.
(7) GPC: molecular weights were polystyrene equivalent.
(8) Melt viscosity was measured with a Brookfield Thermosel, Series RVT, Spindle 21.

Examples 13–14

Two products were made in a commercial Continuous Stirred Tank unit at 55° C. using aluminum chloride in powder as catalyst according to the feed compositions given in the table below. The feed composition was completed to 100% with a non-interfering aliphatic solvent such as Isomerat as described in the notes to Tables III and IV.

Ex. 13 was made with a $C_5$ stream from which the dicyclopentadiene and alkylcyclodienes have been removed through distillation. Ex-14 was the Raw $C_5$ based product.

TABLE V

Examples of Resin made in Continuous Stirred Tank Reactor

| | Ex 13 | Ex 14 |
|---|---|---|
| Feed Blend (wt %) | | |
| Piperylene cut. | 23 | 24 |
| IBP-70 pip./isopr.) | 21 | — |
| Raw $C_5$ | — | 20 |
| $C_5$–$C_6$ monoolefins. | 30 | 46 |
| $C_8$–$C_{10}$ aromatics | 10 | 10 |
| Styrene | — | — |
| Key Components: | | |
| Piperylene (wt %) | 18.3 | 19.7 |
| Isoprene (wt %) | 4.2 | 3.5 |
| cpd/dcpd (wt %) | 1.3 | 2.9 |
| Diolefins (wt %) | 23.8 | 26.1 |
| Olefins (wt %) | 34.9 | 34.1 |
| D/O | 0.68 | 0.77 |
| Piperyleue/Cyclics | 14.1 | 6.8 |
| Isoprene/Cyclics | 3.2 | 1.2 |
| Softening Point (° C.) | 95 | 93 |

Examples 13b and 14b 120 pts by weight of the product resin from examples 13 and 14 were blended with 100 pts by weight of Vectors® 4111,10 pts by weight of Flexon oil and 1 pt by weight Irganox 1076. The components were mixed in a one liter Z blade laboratory mixer at a temperature of 150° C. for 70 minutes. The data are reported in Table V-B.

TABLE V-B

| Adhesive properties | Ex 13b | Ex 14b |
|---|---|---|
| Viscosity 175° C. (mPa.s) | 90500 | 80000 |
| 180° Peel on steel (N/cm) | | |
| initially | 7.7 | 7.13 |
| 3 days open air ageing | 6.9 | 6.91 |
| Loop Tack on steel (N/25 mm) | | |
| initially | 23.5 | 24.2 |
| 3 days open air ageing | 19.5 | 21.4 |
| Ball Tack (cm) | | |
| initial | 1.5 | 2.0 |
| 3 days open air ageing | 8.5 | 1.5 |

Example 14b, made from a Raw $C_5$ feed blend, shows adhesive properties comparable to those of example 13b, made from a traditional feed, and superior properties regarding ball tack after ageing.

In Examples 15–17 blends were made of resin and base polymer in a one liter Z blade laboratory mixer at a temperature of 150° C. for 70 minutes. The formulation and properties are reported in Table VI.

TABLE VI

Formulations and PSA properties

|  | Ex 15 | Ex 16 | Ex 17 |
|---|---|---|---|
| V4111 | 100 | — | 100 |
| DPX-511 | — | 100 | — |
| Resin from Ex 14 | 100 | 100 | — |
| Resin from Ex 13 | — | — | 100 |
| Flexon 876 | 10 | 10 | 10 |
| Irganox 1076 | 1 | 1 | 1 |
| 180 peel adhesion (N/cm) | 5.97 | 607 | 5.45 |
| Loop tack (N/25 mm) | 18.8 | 19.9 | 20.1 |
| Shear on cardboard at RT (hrs) 12.5 mm* 25 mm - 1 kg | >100 | >100 | >100 |
| Shear on cardboard at 40° C. (hrs) 12.5 mm* 25 mm - 1 kg | 25h21' af > 50 21h31' af > 50 | >50 13h25' af >50 | 0h03' af 0h05' af 2h01 af 2h22' af |
| SAFT (° C.) 12.5 mm* 25 mm - 1 kg | 95.2 cf | 92.6 cf | 93.3 cf |
| Blend viscosity at 175° C. (cps) (spindle 27/10–2.5 rpm-after 2 hrs) (Brookfield AS 1) | 133000 | 98200 | 103750 |
| Coating weight (gsm) |  | 18–20 |  |

*V4111 is an SIS linear triblock copolymer with 18 wt % styrene and MFR of 12 and an Mn of 120,000 produced by Dexco Polymers in Louisiana, USA and sold under the trade name VECTOR ™ 4111.
*DPX-511 is an SIS linear triblock copolymer with 18 wt % styrene, and MFR of 15 and Mn of 100,000.
*Flexon 876 is a processing oil.

Resin

Ring and ball softening point was measured according to ASTM E-28.

Melt viscosity was measured according to ASTM D-3236.

Wax cloud point was the temperature at which there is a haze or "cloud" in a mixture of parts of paraffin wax, Escorene and of test resin heated at 200° C. and allowed to cool in air with stirring.

Molecular weight was measured by Gel Permeation Chromatography against polystyrene standards with molecular weights ranging from 162 to 66 M.

Block copolymer

MFR was measured by ASTM D-1238.

Molecular weight was measured by GPC using the method described by J. R. Runyon et al., J. Polym. Sci. 13,2359, (1969).

Adhesive

180° C. peel (N/cm) was measured on steel according to AFERA TM 4001.

Loop tack (N/25 mm) on steel was measured according to FINAT TM9.

Ball tack (cm) as measured according to PSTC6.

Shear was measured according to PSTC7 except that the sample was 25 mm×12.5 mm with a 1 kg weight.

SAFT (Shear Adhesion Fail Temperature) was measured by adhering a coated polyethylene strip of 25 mm width to stainless steel via press lamination with a contact area of 12.5 mm×25 mm, hanging samples in an oven at 24° C. and suspending a 500 gram weight from the bottom of the strip. The temperature is raised at 0.4° C./min and the bond failure temperature is measured. The SAFT is the average of three test samples.

Viscosity was measured according to ASTM D-3236.

Examples 18 and 19 Hydrogenation of Raw $C_5$ based resins

Example 18 is the result of the hydrogenation in a continuous reactor of a solution of the product resin from Example 14 in an hydrocarbon solvent (Varsol 1) with a Ni—W on alumina catalyst (5 weight % nickel oxide, 21 weight % Tungsten oxide). The catalyst was used at a feed rate of 1.5 volume resin solution per volume catalyst per hour (VVH) and had the properties described in Table VIII. Example 19 resulted from the hydrogenation in a batch reactor of a solution of the product of example 14 in Exxsol D 40 with a palladium on carbon catalyst (5 wt % of Pd on carbon and 15 weight % catalyst load, base upon the weight of the solution) under the autoclave conditions in Table VII. Example 20 was run according to the same procedure as example 18, except that a Nickel Tungsten catalyst on gamma-alumina was used. Example 21 was run according to the same procedure as Example 20, except that the catalst was used at a feed rate of 1 volume resin solution per volume catalyst per hour (VVH).

TABLE VII

Examples of Resin Hydrogenation

|  | Ex 18 | Ex 19 | Ex 20 | Ex 21 |
|---|---|---|---|---|
| Process Conditions |  |  |  |  |
| Mode | Isothermal | batch | Isothermal | Adiabatic |
| Pressure (Bar) | 55 | 50 | 50 | 57 |
| Inlet Temperature (° C.) | 250 | 125 | 250 | 210 |
| Resin in the solution (wt %) | 40 | 15 | 15 | 30 |
| Resin Properties |  |  |  |  |
| Initial Color (YI)[*] | 54 | 54 |  | 54 |
| Color after Hydrog. (YI)[*] | 4–7 | 28 |  | 3/4 |

[*]: A solution of 50 weight % resin and 50 weight % toluene p.a. was spectrophotometrically analyzed on a Hunterlab Ultrascan Spectrophotometer. Total Transmittance mode was used and the Yellowness Index YID1925 was recorded.

TABLE VIII

|  | EX 18 | EX 20 & 21 |
|---|---|---|
| $WO_3$/NiO (wt %/wt %) | 22.4/5.0 | 20.1/5.3 |
| Surface Area, m²/gm | 172 | 234 |
| Pore Volume, cc/gm | 0.65 | 0.64 |
| Pore Vol. Dist. (cc/gm) |  |  |
| 0–200 Å Dia. | 0.40 | 0.383 |
| 200–2000 Å Dia. | 0.06 | 0.112 |
| 2000–20,000 Å Dia. | 0.16 | 0.081 |
| 20,000–150,000 Å Dia. | 0.01 | 0.065 |
| >150,000 Å Dia. | 0.02 | ~0+ |
| Shape, 1.6 mm Radius* | S | R |
| % > 10,000 Å | 4.6 | 10 |
| % > 1,000 Å | 29 | 23 |

*S = shaped particle support; R = cylindrical particle support + = below detectable level For the purposes of U.S. law all references, testing procedures and priority documents are incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A process for producing a resin consisting of combining a reactor feed blend of:

(a) at least 2 weight % of isoprene,
(b) greater than 2 weight % of one or more of dicyclopentadiene, substituted cyclopentadienes and substituted dicyclopentadienes,
(c) at least 2 weight % piperylene,
(d) at least 1 weight % aromatic olefins, and
(e) 0 to 92 weight % of aliphatic olefins, based upon the weight of the reactor feed blend, with a polymerization catalyst consisting of at least one Lewis acid under polymerization conditions;
wherein the ratio by weight of component (c) to component (b) is less than 8 and the ratio by weight of component (a) to component (b) is less than 5; and
wherein the resin produced has a weight average molecular weight of 4000 or less, and an Mw/Mn of 3 or less.

2. The process of claim 1 wherein the polymerization conditions comprise a temperature between 0° C. and 200° C.

3. The process of claim 1 wherein the polymerization occurs in one or more continuous or batch reactors.

4. The process of claim 1 wherein the aliphatic olefin is one or more $C_4$ to $C_{20}$ linear, branched or alicyclic olefins.

5. The process of claim 1 wherein the aliphatic olefins comprise one or more natural or synthetic terpenes.

6. The process of claim 1 wherein the aliphatic olefin comprises preferably one or more of alpha-pinene, beta-pinene, Δ-3-carene, isoprene dimers, dipentene or limonenes.

7. The process of claim 1 wherein the aromatic olefins are selected from the group consisting of styrene, indene, alkylated derivatives of styrene, and alkylated derivatives of indene.

8. The process of any of claim 1 wherein the aromatic olefins are selected from the group consisting of styrene, alpha-methyl-styrene, beta-methyl-styrene, indene, methyl-indenes and vinyl toluenes.

9. The process of claim 1 wherein the component (b) is present in an amount greater than 2 weight % and no higher than 25 weight %.

10. The process of claim 1 wherein the polymerization conditions comprise a temperature between 0° C. and 80° C. and the polymerization catalyst is present at 0.3 to 1.0 weight % based upon the weight of the feed blend.

11. The process of claim 1 wherein the piperylene is present at 5 to 70 weight %.

12. The process of claim 1 wherein the piperylene is present at 5 to 20 weight %, component (b) is present in an amount greater than 2 weight % and no higher than 25 weight %, the isoprene is present at 2 to 20 weight %, and the aromatic olefins are present at 1 to 30 weight %.

13. The process of claim 1 wherein the aromatic olefins are present at up to 50 weight %.

14. The process of claim 1 wherein the aromatic olefins are present at 2 to 25 weight %.

15. The process of claim 1 wherein the polymerization catalyst is an aluminum trichloride, boron trifluoride, aluminum tribromide or a mixture thereof.

16. A process for producing a resin consisting combining a reactor feed blend of:
(a) at least 2 weight % of isoprene,
(b) greater than 2 weight % of one or more of dicyclopentadiene, substituted cyclopentadienes and substituted dicyclopentadienes,
(c) at least 2 weight % piperylene,
(d) at least 1 weight % of at least one of styrene, alpha-methyl-styrene, beta-methyl-styrene, indene, methyl indenes and vinyl indenes, and
(e) 0 to 92 weight % of a $C_4$–$C_{20}$ aliphatic olefins, based upon the weight of the reactor feed blend, with a polymerization catalyst consisting of at least one Lewis acid under polymerization conditions provided that the ratio of component (c) to component (b) is less than 8 and the ratio of component (a) to component (b) is less than 5; and the resin has a weight average molecular weight of 4000 or less, and an Mw/Mn of 3 or less.

* * * * *